United States Patent
Rosenblum

(10) Patent No.: US 9,085,388 B2
(45) Date of Patent: Jul. 21, 2015

(54) STORAGE CONTAINER SYSTEMS AND METHODS

(71) Applicant: Dean Rosenblum, Mount Kisco, NY (US)

(72) Inventor: Dean Rosenblum, Mount Kisco, NY (US)

(*) Notice: Subject to any disclaimer, the term of this patent is extended or adjusted under 35 U.S.C. 154(b) by 19 days.

(21) Appl. No.: 13/945,463

(22) Filed: Jul. 18, 2013

(65) Prior Publication Data

US 2015/0021322 A1    Jan. 22, 2015

(51) Int. Cl.
*A63H 33/28* (2006.01)
*B65D 21/02* (2006.01)
*B65D 25/20* (2006.01)

(52) U.S. Cl.
CPC ............ *B65D 21/0223* (2013.01); *A63H 33/28* (2013.01); *B65D 21/0233* (2013.01); *B65D 25/205* (2013.01)

(58) Field of Classification Search
CPC .................................. B65D 1/04; A63H 33/28
USPC ............ 220/23.83, 23.4, 23.2, 23.86; 40/312; 206/472, 216
See application file for complete search history.

(56) References Cited

U.S. PATENT DOCUMENTS

| 180,132 | A | * | 7/1876 | Hoard | 215/6 |
| 3,732,999 | A | * | 5/1973 | Rounkles | 215/6 |
| 6,688,935 | B1 | * | 2/2004 | Lin | 446/15 |
| 8,033,409 | B2 | * | 10/2011 | Lindemann | 220/4.21 |

* cited by examiner

*Primary Examiner* — Steven A. Reynolds
*Assistant Examiner* — King M Chu
(74) *Attorney, Agent, or Firm* — Buckley, Maschoff & Talwalkar LLC

(57) ABSTRACT

Pursuant to some embodiments, a container system includes a container housing having a bottom and a plurality of integrally connected walls, the bottom and walls having an interior face defining an interior holding area of the container housing and an outwardly facing exterior face; and a container cover coupled to the exterior face of at least one of the plurality of walls, the container cover having a bottom wall, pair of opposing sidewalls, and a face panel integrally connected to the bottom wall and sidewalls of the container cover; and an interior surface of the face panel opposite and spaced apart from the exterior face of the at least one of the plurality of walls, the interior surface of the face panel and the exterior face of the at least one of the plurality of walls defining a void therebetween.

27 Claims, 10 Drawing Sheets

STORAGE CONTAINER SYSTEMS AND METHODS

BACKGROUND

Various products, including food products and spices, are typically sold in a wide variety of retail package sizes and configurations, including cardboard boxes, plastic and paper bags, and bottles of varied sizes, shapes, and capacities. And, even when similar products from different manufacturers or brands have substantially the same amount of product in a package, for example one pound of a particular product, those different manufacturers' products may each be marketed in retail packaging that is of a different shape or configuration. Some of the differences in package configurations may be attributable to the manufacturers trying to differentiate their product offerings from other competing brands, or to deliver a particular amount of product at a particular price point to the end consumer, to which package configuration contributes significantly.

Consumers, including residential and industrial users, typically store products sold in the variety of package sizes and configurations in or on shelves, counters, and pantries. However, due to the variety of package sizes and configurations, storing products in their retail packaging is often an inefficient use of counter and/or shelf space.

And while many containers are available to enable a more efficient, organized, and appealing storage of these items, some key needs of consumers remain unmet by the presently available storage container solutions. Specifically, at least three key problems remain. First, when a consumer removes product—e.g., rice, flour, pasta, or the like, from its retail package, and decants said product into a storage container, it is often desirable to retain much of the information contained on or in the original retail packaging, e.g., brand, ingredient, nutritional information and/or cooking instructions. It is common for consumers to remove this information from the original retail packaging by cutting it from the label, bag, or box, and placing these label excerpts inside the container with the food items or, alternatively, taping the information to the outside of the container, thereby relegating the consumer to digging through the food items or un-taping the label excerpts to retrieve the labeling information.

Second, when the volume of product inside a particular container gets low, and it becomes necessary to refill the container, it also becomes necessary to procure and store a "back-up" box or bag of the food item. However, as it is oftentimes undesirable to comingle the new product with the old, a user is required to store the new product until the container is completely empty, only then refilling the container with the new product. This necessitates the storing of redundant containers of the same product—the decanted older product in the nearly empty storage container and the unopened container of new replacement product, thus consuming additional space in often already-over-crowded pantries and cabinets.

Third, it is often desirable to store prepared foods under refrigeration to maintain freshness and food safety until the stored food is to be consumed. But, sometimes the prepared foods are still warm from preparation or service, or at room-temperature, and require the ambient cold from the refrigerated air to cool them down. However, stacking containers of still-warm food prevents airflow between containers.

Accordingly, it would be desirable to provide container systems and methods that address these and other problems. Other advantages and features will become apparent upon reading the following disclosure.

DESCRIPTION

Embodiments herein relate to container systems that provide, in various configurations, convenient and efficient storage for a wide variety and types of items. In some embodiments, one or more of the container systems disclosed herein may be used to conveniently and efficiently store quantities of food product(s) in a well-organized manner.

Figure 1:
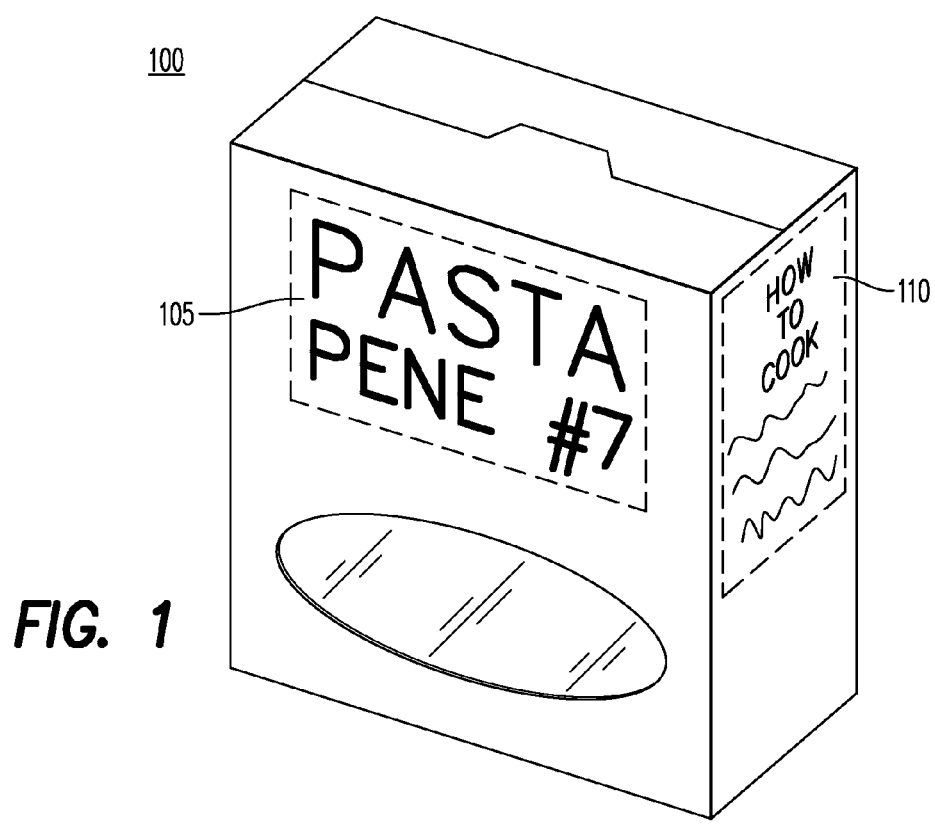
FIG. 1 is a perspective view of a representative retail package.

Referring to FIG. 1, an illustrative retail package 100 is illustrated. In the example of FIG. 1, package 100 is a retail container of pasta. The package depicted in FIG. 1 may be typical of a retail package commercially available for purchase by a consumer for use in a residential context. Package 100 is illustrated as having one or more labels 105 and 110. Label 105 may primarily include a name (e.g., a brand name or a generic descriptor) of the product contained integral to, or within package 100 or some other descriptive identifier. Label 110 may include additional information related to the contents of package 100 such as, for example, cooking/preparation instructions, nutritional information, ingredient listing, recipes, etc. In some aspects, labels 105, 110, and other labels (not shown) may include pictures and other graphics.

In general, a label as used herein may encompass any physical media having text, graphics, or other indicia printed or stored thereon. In some embodiments, text and graphics may be printed on a paper or other sheet material. In some embodiments, a machine readable code (e.g., a barcode or a Quick Response, QR, code) may be printed on the label. In some aspects, a label herein may include program instructions executable by a computer or processor that are stored on a tangible media product.

It is noted that package 100 does not imply any limits onto products or packages of products that may, in one way or another, be referenced and/or used or associated with an embodiment of a container system herein.

Figure 2:
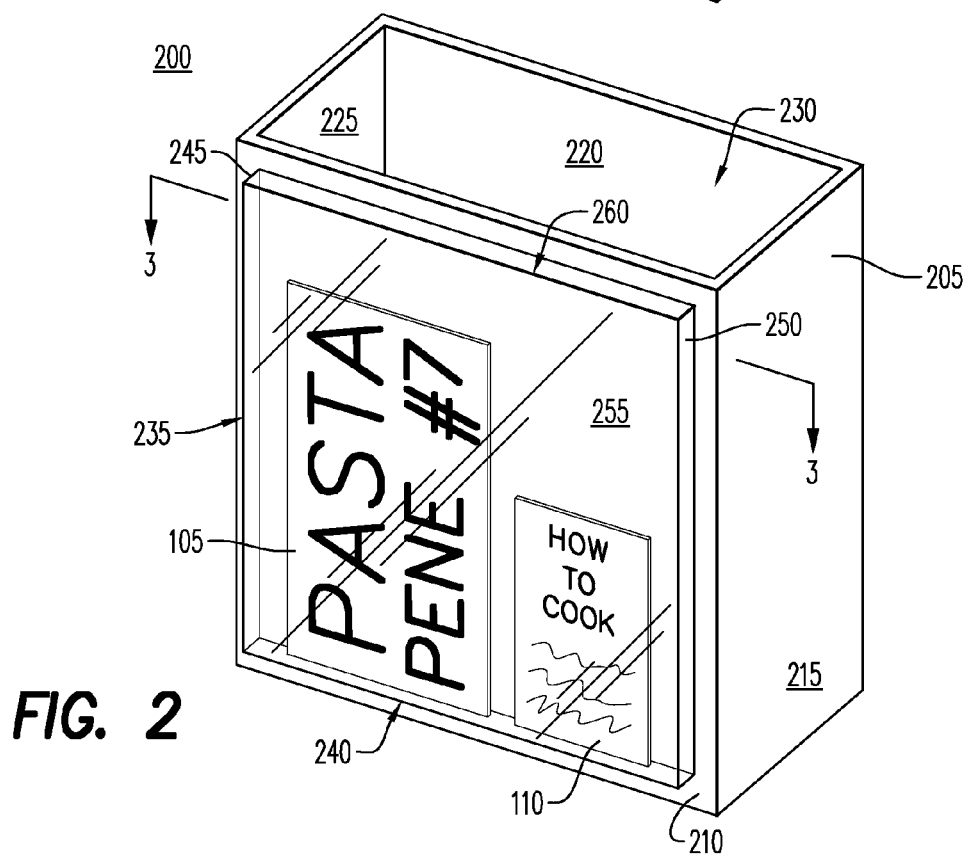
FIG. 2 is a perspective view of a container system having a container cover, according to some embodiments herein.

FIG. 2 is an illustrative depiction of a container system 200, in accordance with some embodiments herein. Container system 200 includes a container housing 205. Container housing 205 generally includes a bottom or floor (not shown) and a plurality of integrally connected walls 210, 215, 220, and 225. The bottom and plurality of integrally connected walls each have an interior face and an outwardly facing exterior face. The interior faces of the bottom and plurality of integrally connected walls cooperate to define an interior holding area 230 within container housing 205. In some embodiments, container system 205 may include a sealable lid (not shown).

In some aspects, container housing 205 may be suitably sized to receive product decanted or emptied from another container or package such as, for example, package 100. In some embodiments, container housing 205 may be sized to hold a predetermined volume of product, wherein that predetermined volume corresponds to an industry or marketplace "standard" or conventional packaging size. For example, the interior holding area 230 of container 205 may be sized or have a volume sufficient to receive one or more units of a "conventional" sized retail package of a 14.5 ounce package of dry pasta, a 5 pound bag of sugar, rice, or flour, etc.

A container cover 235 is shown coupled to an exterior face of one of the walls (e.g., wall 210) of container housing 205. Container cover 235 may generally comprise a bottom wall 240, a pair of opposing sidewalls 245 and 250 that are integrally connected to bottom wall 240, and a face panel 255 integrally connected to the bottom wall and the sidewalls of the container cover. In some aspects, a space, chamber or void 260 is created or defined between an interior surface of face panel 255 and the exterior face of the wall (e.g., 210) to which the container cover is coupled. Container cover 235 is shown attached to wall 210 in FIG. 1. In some embodiments, container cover 235 may also include a top wall (not shown) opposite bottom wall 240 that attaches to and cooperates with sidewalls 245, 250 to form a cover(ing) to seal a top portion of space 260. In some aspects, the top wall of container cover 235 may be selectively opened, closed, removed, and replaced by a user. In some embodiments container cover 235 may be selectively removed from and replaced to container housing 205 by a user.

In some embodiments, a container cover may be attached to two or more walls of a container. For example, embodiments herein may include a container cover (not shown) that is attached to an exterior face of two (or more) walls of a container housing (e.g., walls 210 and 215 of container housing 205), wherein such a container cover wraps around the corner(s) joining the walls. In some embodiments, a container housing herein may have more than one container cover attached or couple to the exterior walls thereof, where the more than one container covers are attached to at least one of the walls of the container housing.

As illustrated in FIG. 2, one or more labels such as, for example, labels 105 and 110 may be placed or disposed into void 260. The label(s) may be securely held within space 260 by virtue of the presence and dimensions of bottom wall 240, sidewalls 245, 250, and face panel 255 of container cover 235, and, in some instances, a top wall (not shown). In some instances, labels 105 and 110 may be removed from package 100. In some other instances, labels 105 and 110 may be created or obtained by a user from a source other than package 100. In some embodiments, labels placed within void 260 may comprise a repositionable label having a removable adhesive that allows the labels to be applied, cleanly removed, and reapplied on at least some surfaces.

In some embodiments, at least a portion of face panel 255 is either semitransparent or transparent. In the instance at least a portion of face panel 255 is either semitransparent or transparent, then the label(s) contained between face panel 255 and the exterior wall of the container housing 205 may be visible to a user. In particular, the writings, pictures, icons, and other indicia on the label(s) may be legible to a user through the semitransparent or transparent portion of face panel 255 so that the user can readily read or interpret the writings, pictures, icons, and other indicia thereon.

In some embodiments, container cover 235 is integrally or fixedly attached to container housing 205. In some embodiments, container cover 235 may be removably attached to container housing 205. The mechanism(s) for attaching the container cover to the container housing may be adapted to fit a particular, desired application based on factors such as, for example, whether the container cover will be removable or fixed, the material used to construct the container cover and/or the container housing, the intended use of the container system, and other factors. In some aspects, container housing and a container cover attached thereto may be manufactured of a ceramic, plastic, glass, metal, or other types of materials. In an instance the container housing and the container cover(s) attached thereto are manufactured of, at least in part, a magnetic material, then the cover container may be (removably) attached to container housing by a magnetic coupling mechanism.

Figure 3:
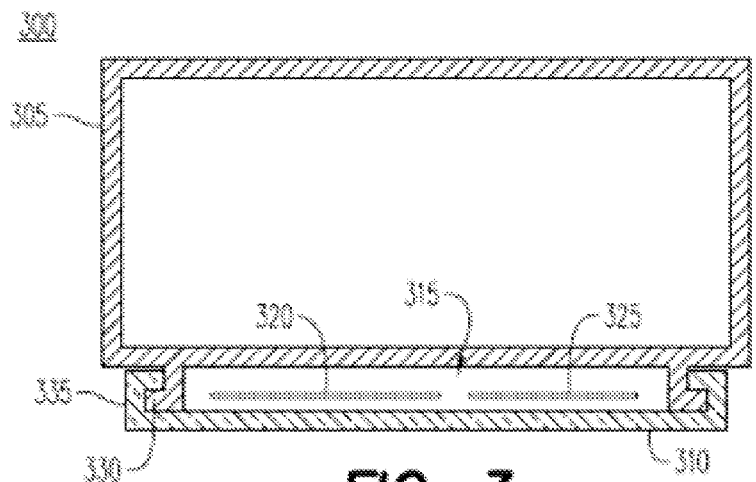
FIGS. 3, 3A, and 3B are each cross-sectional views of a container system having a container cover, according to some embodiments herein.
Figure 3A:
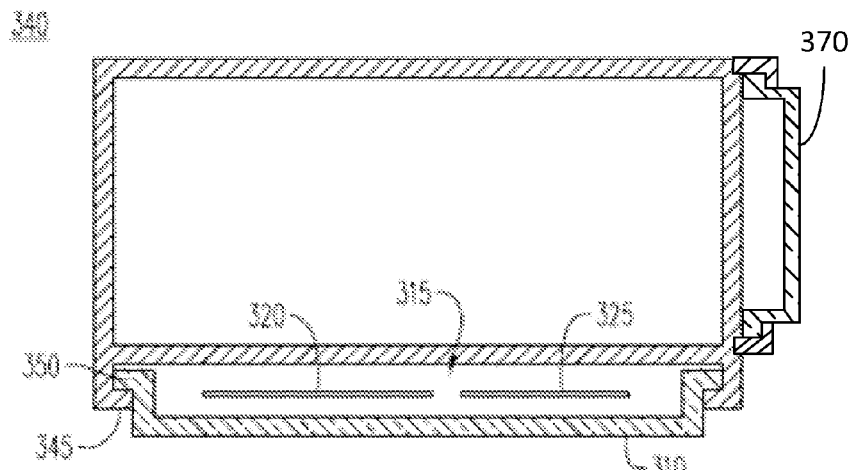
Figure 3B:
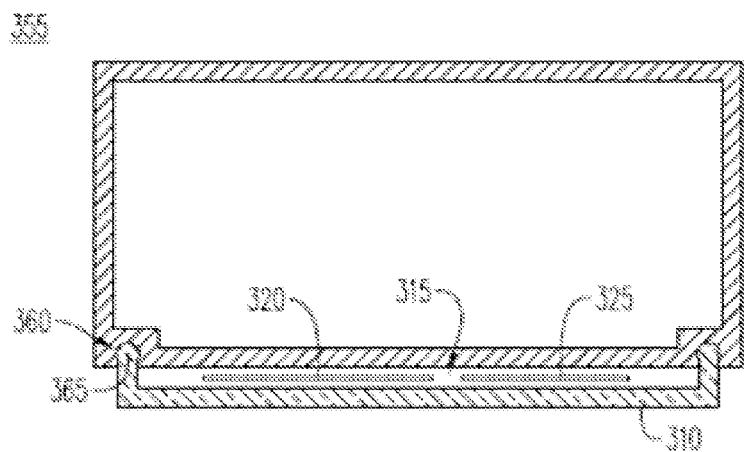

FIGS. 3, 3A, and 3B each illustrate means or mechanisms that may be used to couple or otherwise attach a container cover to a container housing according to some embodiments herein. FIG. 3 is a top-down sectional view of a container system 300 having a container housing 305 and a container cover 310. As shown, container cover 310 and container housing 305 cooperate to define a void or space 315 to accommodate one or more labels therebetween. In the example of FIG. 3, labels 320 and 325 are disposed in space 315. Furthermore, container housing 305 includes a cover coupling 330 that is integral to an exterior face of a wall of the container housing. Cover coupling 330 may extend around an extant of the exterior face of the wall of the container housing, including one or more sides corresponding to the dimensions and configuration of container cover 310. Container cover 310 may include a container coupling 335 integral thereto to engage with the cover coupling of container housing 305. In the example of FIG. 3, container coupling 335 "snaps" or slides over the cover coupling 330 of the container housing in order to couple the container cover to the container housing.

FIG. 3A is a top-down sectional view of a container system 340 having a container housing 305 and a container cover 310, similar to FIG. 3. Container cover 310 and container housing 305 cooperate to define a space 315 that accommodates one or more labels therebetween. Container housing 305 includes a cover coupling 345 that is integral to an exterior face of a wall of the container housing. Cover coupling 345 may extend around an extant of the exterior face of the wall of the container housing, including one or more sides corresponding to the dimensions and configuration of container cover 310. Container cover 310 may include a container coupling 350 integral thereto to engage with cover coupling 345 of container housing 305. In the example of FIG. 3A, container coupling 350 "snaps" or slides inside of cover coupling 345 of the container housing in order to couple the container cover to the container housing. FIG. 3A further includes an illustrative example of a second container cover 370. Similar to container cover 310 and container cover 235 of FIG. 2, second container cover 370 has a bottom wall, a pair of opposing side walls, and a face panel integrally connected to the bottom wall and sidewalls, and an interior surface of the face panel opposite and spaced apart form the exterior face of a second at least a one of the plurality of walls, the interior surface of the face panel of the second container cover and the exterior face of the second at least one of the plurality of walls defining a void therebetween.

FIG. 3B is a top-down sectional view of another container system 355 that includes a container housing 305 and a container cover 310. As shown, container cover 310 and container housing 305 also cooperate in this example to define a void or space 315 to accommodate one or more labels therebetween. Container housing 305 includes a cover coupling 360 that is integral to an exterior face of a wall of the container housing. Cover coupling 360 may extend around an extant of the exterior face of the wall of the container housing, including one or more sides corresponding to the dimensions and configuration of container cover 310. Container cover 310 may include a container coupling 365 integral thereto to engage with the cover coupling of container housing 305. In the example of FIG. 3B, container coupling 365 "snaps" into the cover coupling recess 360 of the container housing in order to couple the container cover to the container housing.

It will be appreciated that while FIGS. 3, 3A, and 3B each illustrate means or mechanisms that may be used to couple or otherwise attach a container cover to a container housing according to some embodiments herein, these examples are not intended to nor do they represent an exhaustive listing or the full scope of the container housing and container cover coupling means herein.

Figure 4A:
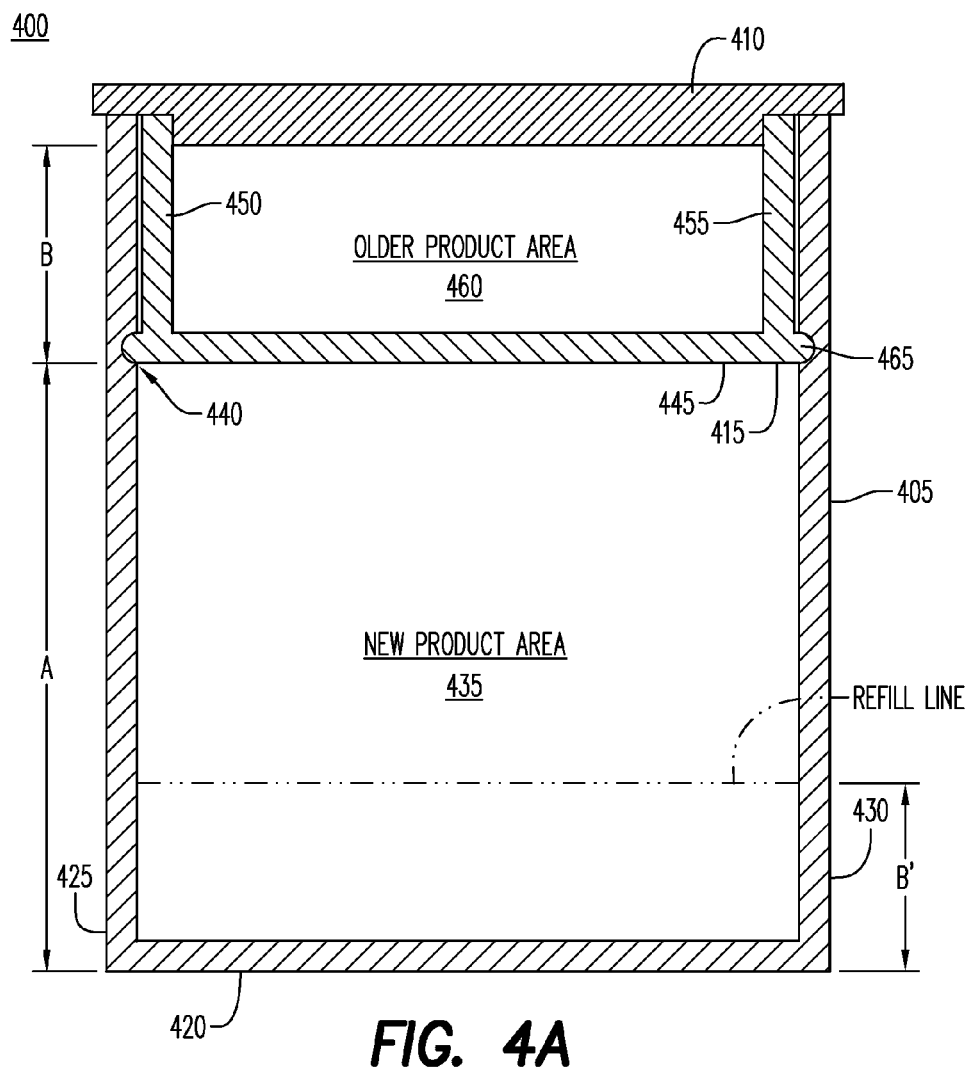
FIGS. 4A and 4B are each cross-sectional views of a container system having a sub-container, according to some embodiments herein.

FIG. 4A is an illustrative depiction of a container system, generally referenced at numeral 400. Container system 400 includes a main container 405, a lid 410, and a sub-container 415. Main container 405 may generally include a bottom wall 420 and a plurality of sidewalls (e.g., 425 and 430) integrally connected to the bottom wall. In some aspects, the bottom wall and sidewalls have an interior face that cooperate and define an interior holding area 435 of the main container. Main container 405 may also include a sub-container coupling 440 formed in or on at least one of the interior faces of at least one of the sidewalls within the interior holding area 435 of main container 405. Sub-container coupling 440 may be formed in or on, for example, one, two, or four of the sidewalls of a main container of container system 400. Sub-container 415 may be adapted to be removably coupled or attached to sub-container coupling 440 such that the sub-container may be selectively disposed in interior holding area 435 of main container 405. In some embodiments, sub-container 415 may have a bottom wall 445 integrally connected with a plurality of sidewalls (e.g., 450 and 455) of the sub-container, where the bottom wall and sidewalls of the sub-container have an interior face defining an interior holding area 460 of the sub-container.

In some embodiments, an upper peripheral portion of the sidewalls of sub-container 415 are substantially even with an upper peripheral portion of the sidewalls of main container 405 when sub-container 415 is attached to sub-container coupling 440 and disposed in interior holding area 435 of the main container. In this manner, as illustrated in FIG. 4A, the upper peripheral portion of the sidewalls of sub-container 415 and the upper peripheral portion of the sidewalls of main container 405 are substantially even and lid 410 can easily and efficiently cover both the main container and the sub-container. In some embodiments, the upper peripheral portion of the sidewalls of sub-container 415 are lower than an upper peripheral portion of the sidewalls of main container 405 when sub-container 415 is attached to sub-container coupling 440 and disposed in interior holding area 435 of main container 405. Here also, lid 410 may still easily and efficiently cover both the main container and the sub-container. When lid 410 is placed atop of and covers a top opening of both the main container and the sub-container as shown in FIG. 4A, container system 400 provides a storage system wherein multiples thereof may be efficiently and neatly arranged, including stacked, in or on a shelf, counter, cupboard, or other location. In some embodiments, sub-container 415 includes a container coupling 465 that engages with sub-container coupling 440 to removably couple or attach the sub-container to main container 405. In some instances, container coupling 465 of sub-container 415 may be located at or along at least one peripheral edge of the sub-container. In some aspects, the location, size, and overall configuration of the container coupling of a sub-container may correspond to the location, size, and configuration of a main container's sub-container coupling to which it will mate.

Figure 4B:
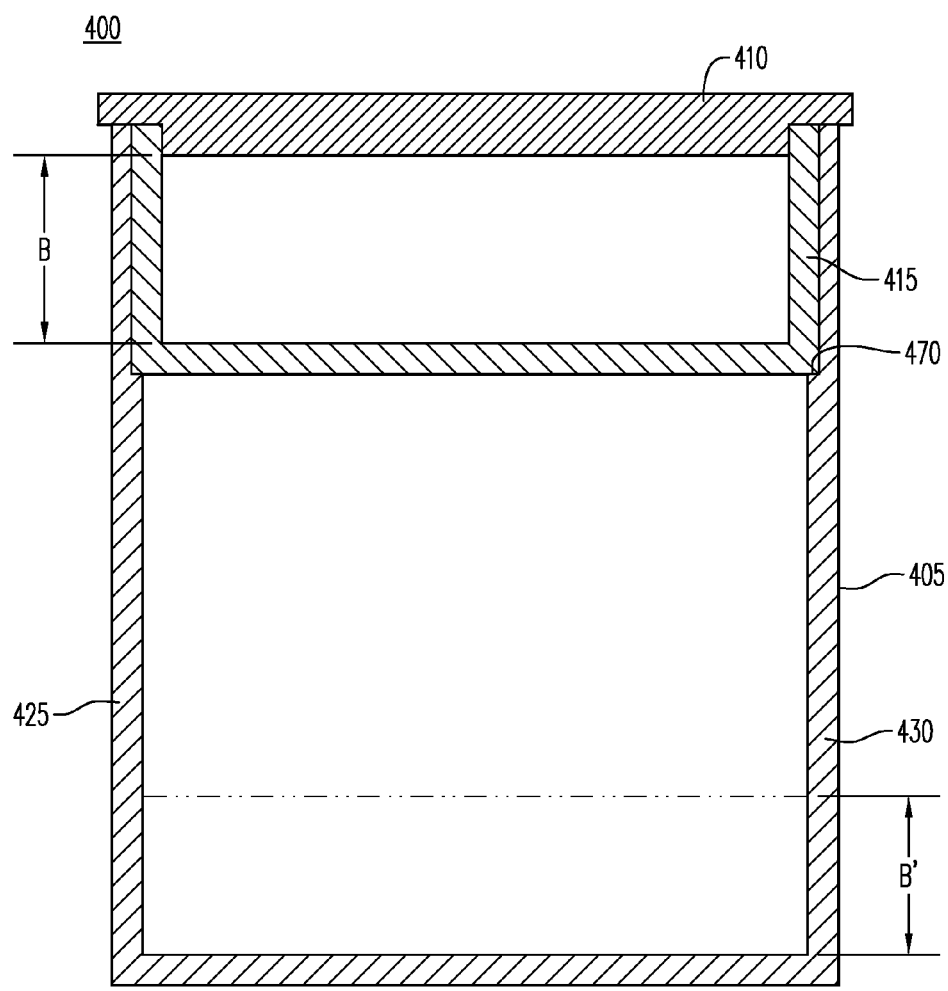

In some embodiments, as shown in FIG. 4B, main container 405 may be formed such that a lower portion of the side walls 425 and 430 are thicker than an upper terminal portion of the side walls, where an upper terminal end of the thicker lower side-wall portion forms a "shoulder" that may support the bottom of sub-container 415. In some embodiments, sub-container 415 may be formed with a ridge, lip, or other protrusion on an upper edge of the interior wall to enable easier removal of sub-container 415 from main container 405. In some embodiments, sub-container 415 may be formed with a slot, recession, or any other type or configuration of handhold that may be easily gripped by the user when removing the sub-container from main container 405.

In some aspects, lid 410 may operate to provide a relatively air-tight seal at an open end of main container 405 and sub-container 415. In some embodiments, sub-container 415 may matingly fit into main container 405 and form a relatively air-tight seal between main container 405 and sub-container 415.

In some embodiments herein, the volume of the interior holding area of main container 405 below sub-container 415 (indicated by A in FIG. 4A) may be predetermined and sized to accommodate (at least) a "standard" packaging volume. For example, the volume of this area may be sized to hold a "standard" 5 pound bag of flour, a 1 pound bag of beans, a 14 ounce box of breakfast cereal, a 2.5 ounce container of spice, etc.

In some aspects herein and as depicted in FIG. 4A, the volume of the interior holding area of sub-container 415 (indicated by B in FIG. 4A) may be predetermined and sized to accommodate about 15% to about 50% of a "standard" packaging volume, including in some embodiments about 20% to about 30%. For example, the volume of this area may be sized to hold about 20% of a "standard" 5 pound bag of flour, a 1 pound bag of beans, a 14 ounce box of breakfast cereal, a 2.5 ounce container of spice, etc.

In some embodiments, an indication such as a printed line or some other indicia may be provided on main container 405 to indicate a "re-stock" volume of the main container that is about the same volume as the volume or holding capacity of sub-container 415. For example, referring to FIG. 4A, the volume of area B and B' may be approximately equal to each other.

In some embodiments, a retail package of a product (e.g., uncooked basmati rice) may be decanted into a container system such as the one illustrated in FIG. 4A. An existing or "older" quantity of the product may be housed in sub-container 415 (i.e., the "older" product area) while the new, more-recently purchased quantity of the product may be decanted into and contained in interior holding area 435 (i.e., the "new" product area). In a particular use-case, a user may remove lid 410 to access and remove the product from sub-container 415 when they desire to use the product. In this manner, the "older" supply of the product may be used before the "newer" supply of the product is accessed. When the supply of the "older" product is depleted from sub-container 415, the sub-container 415 may then be removed, and the newer product housed in the main container 405 may be accessed. Furthermore, when the quantity of product in main container 405 is depleted to the "restock" point, where the quantity of product is of a volume equal to or less than the level indicated by the idicia at B', the user is then able to remove the product in the main container 405, and decant this older product, in full, into sub-container 415, thus enabling the refilling of main container 405 with a newly purchased quantity of the product, and the replacing of sub-container 415, containing the relatively older product) atop the newer product now contained within main container 405, without co-mingling the newer product with the relatively older product . . .

As demonstrated by the foregoing use-case example, container system 400 may provide a container that can accommodate both "older" and "newer" product stock in a single container system. As demonstrated, use of such a system provides the benefit(s) of efficiently storing a current/existing supply of stock and an inventory supply of product stock that may be use in the future, wherein each store of the product is housed in separate compartments within the same container system. Accordingly, a user need not store both a current/existing supply of stock in a product decanter and an "back-up" inventory supply of product stock in a separate retail or other storage container.

In some embodiments, aspects of container system 400 may include a relatively uniform shape. For example, container system 400 may generally comprise right-angled walls. As such, multiples of container system 400 may be neatly and efficiently stacked or configured on a shelf or counter, thereby maximizing the use of such spaces while providing, for example, a container that can accommodate both "older" and "newer" product stock in a single container system.

In some embodiments, container system 400 may generally form a cylindrical shape. In some embodiments, container system 400 may be formed with walls of main container 405 and sub-container 415 intersecting the bottom of each container at radiused corners (i.e., the interior corners of the container are rounded), to facilitate easier removal from the container with measuring devices such as measuring cups or measuring spoons.

Figure 5:
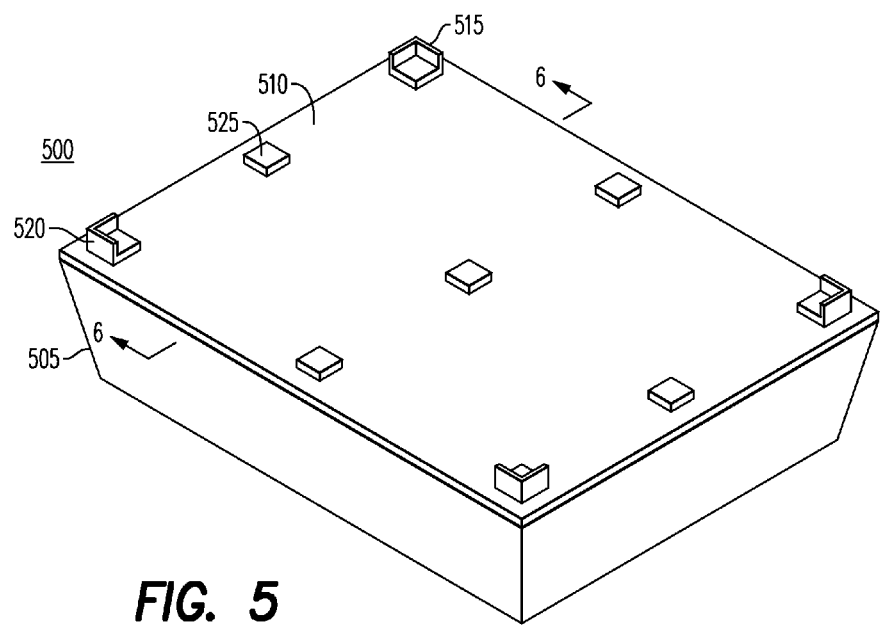
FIG. 5 is a perspective view of a container system having a lid with a plurality of stand-offs disposed thereon, according to some embodiments herein.

FIG. 5 is a perspective view of an illustrative depiction of a container system 500. Container system 500 includes a container 505 having a bottom wall and a plurality of sidewalls integrally connected to the sidewalls, the bottom wall and sidewalls having an interior face defining an interior holding area of the container with an open top. In FIG. 5, the otherwise open top of container 505 is covered by a lid 510. Referring to lid 510, the lid has a lower face (not visible in FIG. 5) to directly interface with and cover the open top of container 505 and a plurality of stand-offs 515, 520, and 525 disposed on an upper surface 512 of the lid. At least one of the stand-offs (520, 515) have a keyed configuration to receive a bottom of another container in a predetermined orientation. For example, stand-offs 515 and 520 comprise a substantially rectangular shaped mass of material having upstanding vertical walls that meet at about a 90° angle. As such, stand-offs 515 and 520 may operate to lift and retain or urge another container placed thereon upwards off of the upper surface 512 of the lid and towards a center portion of the lid. In contrast to stand-offs 515 and 520, stand-off 525 may operate to lift another container placed thereon upwards off of the upper surface 512 of the lid. In some embodiments, the keyed stand-offs may be located, at least, at one or more corner location of lids 510.

Figure 6:
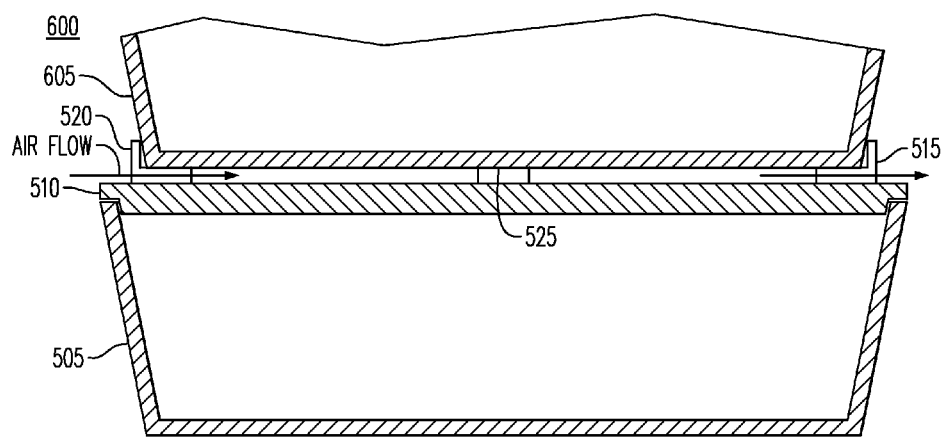
FIG. 6 is a cross-sectional view of the container system of FIG. 5 taken along line 6-6, according to some embodiments herein.

FIG. 6 is an illustrative depiction of two container systems herein configured in a stacked configuration, generally referenced by numeral 600. FIG. 6 includes a sectional view of container 505 of FIG. 5 as viewed from the perspective of line 6-6. System 600 includes container 505 and the corresponding lid 510 of FIG. 5, as well as a container 605. Container 605 is shown aligned with lid 505 and stacked on corner stand-offs 520, 515 and center stand-off 525. The combination of stand-offs 515, 520, 525 cooperate to support the bottom of container 605 in a spaced-apart configuration off of the upper surface 512 of lid 510. In this manner, airflow between containers 505 and 605 may be facilitated and encouraged by system 600. In some contexts, such as but not limited to a food storage context, a flow of ambient air to all sides of a storage container including the bottom, top, and sides, even when stacked one on another, may be beneficial. The stand-offs disposed on the lid in FIGS. 5 and 6 may facilitate the flow of air over and around the surfaces of the containers therein. In some aspects, the overall orientation of the sidewalls of the depicted containers may also contribute to the flow of air over and around the surfaces of the containers shown in FIGS. 5 and 6.

Figure 7:
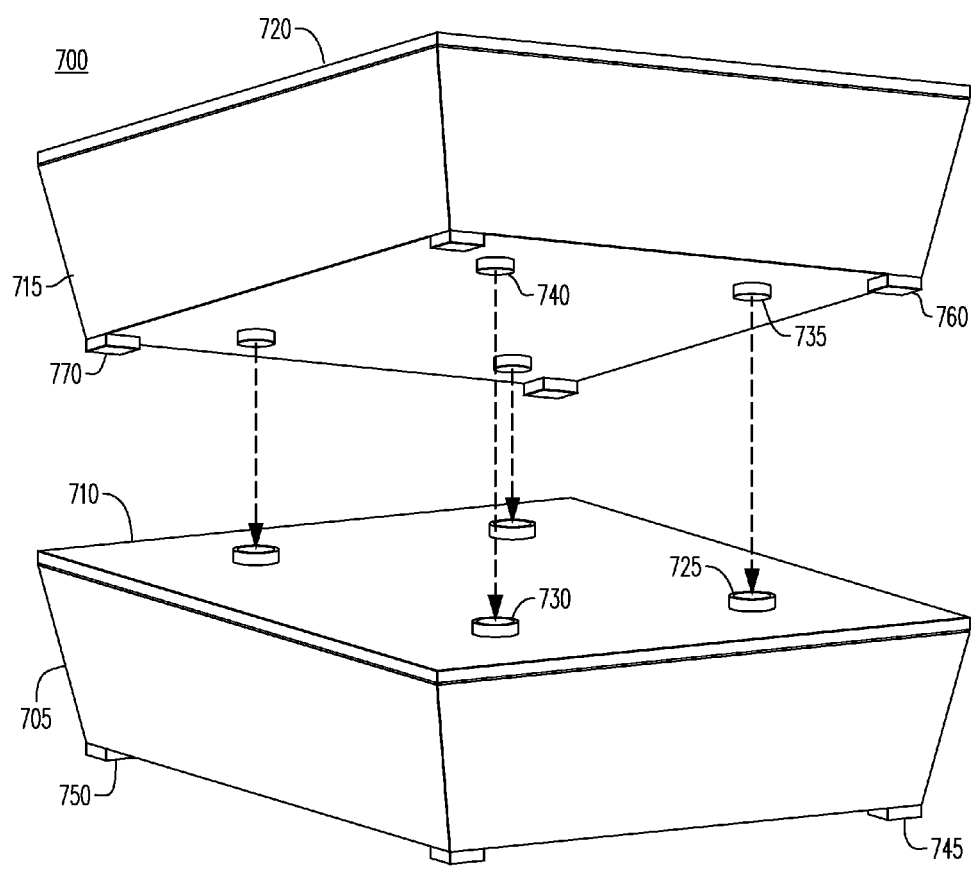
FIG. 7 is a perspective view of a container system depicting a first container aligning with a second container, according to some embodiments herein.

FIG. 7 is an illustrative depiction of a container system 700. Container system 700 includes, as an example and not a limitation, two containers—container 705 having lid 710 and container 715 having lid 720. As shown, each of the containers 705 and 715 have a plurality of feet disposed or located on a bottom surface of the containers. Container 705 has feet 745 and 750 for example, whereas container 715 has feet interior feet 735, 740 and corner feet 760, 770. As further depicted in FIG. 7, at least some of the feet on the bottom of container 715 (e.g., 735, 740, and other interior feet) may be matingly aligned with receptacles (e.g., 725, 730) disposed on lid 710 while other feet (e.g., 760, 770, and other corner feet) on the bottom of the container rest on the planar upper surface of lid 710. Together, the feet on the bottom of container 715 and the receptacles on lid 710 cooperate to securely stack and align the two containers 705 and 715.

Figure 8:
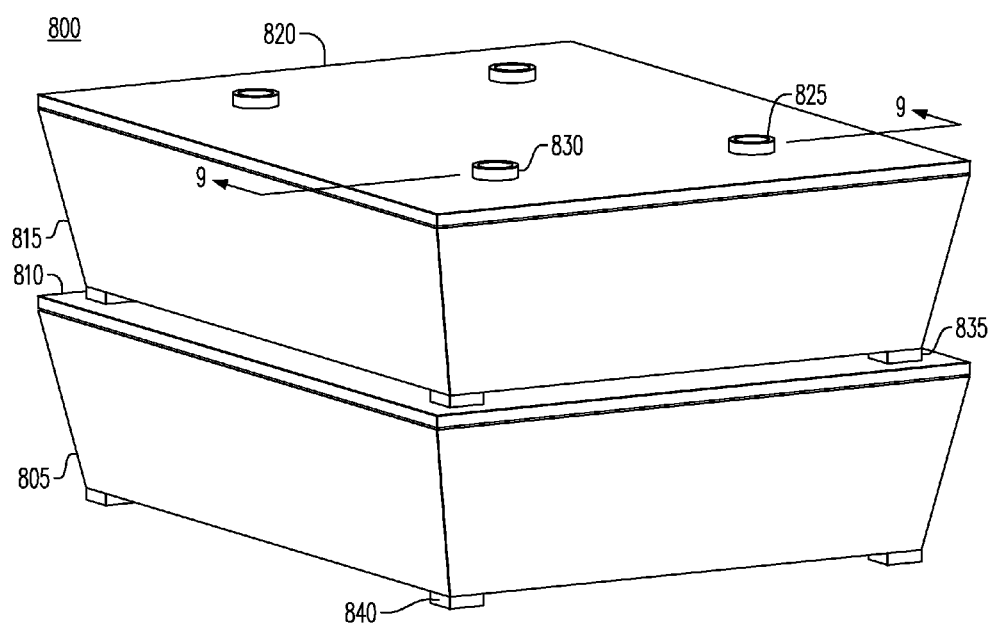
FIG. 8 is a perspective view of a container system depicting a first container in a stacked configuration with a second container, according to some embodiments herein.

FIG. 8 is a depiction of a system of containers 800. FIG. 8 shows a container 805 with a corresponding lid 810 and a container 815 with a corresponding lid 820, all in a stacked configuration. System 800 includes corner feet (e.g., 835, 840) and receptacles located on the lids (e.g., 825, 830). The feet on the bottom of the containers and the receptacles on the lids cooperate to securely stack and align the two containers 805 and 815.

Figure 9:
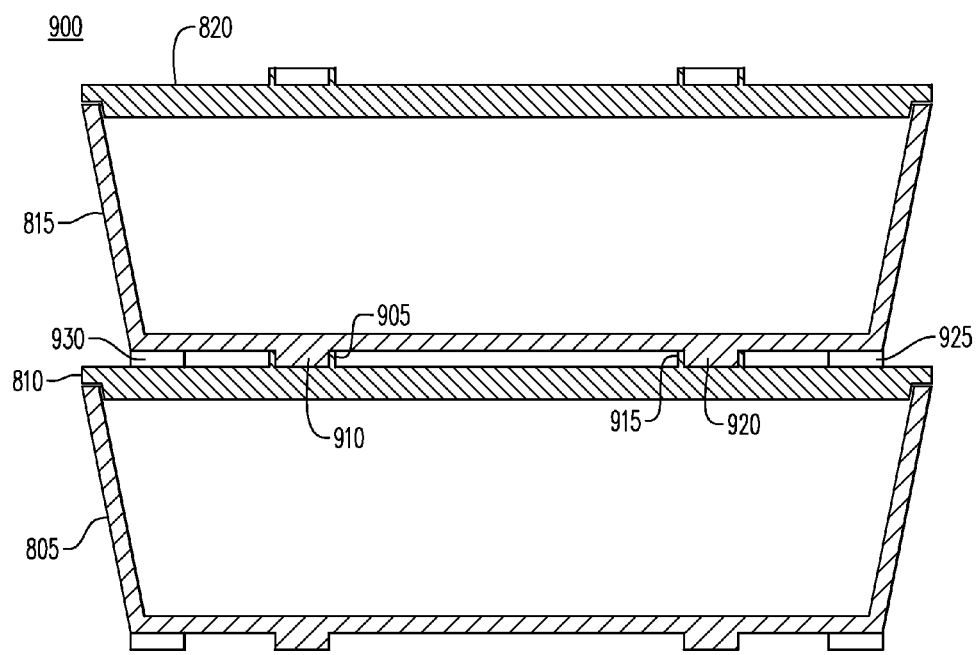
FIG. 9 is a cross-sectional view of the container system of FIG. 8 taken along line 9-9, according to some embodiments herein.

FIG. 9 includes a sectional view of container 805 with corresponding lid 810 and container 815 with corresponding lid 820 of FIG. 8, as viewed from the perspective of line 9-9. FIG. 9 illustrates the feet on the bottom of both containers 805 and 815. For example, corner feet 925 and 930 and interior located feet 910 and 920 are shown disposed on the bottom of container 815. Additionally, FIG. 9 illustrates interior located feet 910 and 920 being aligned with and received in receptacles 905 and 915 located on the upper surface of lid 810.

Figure 10:
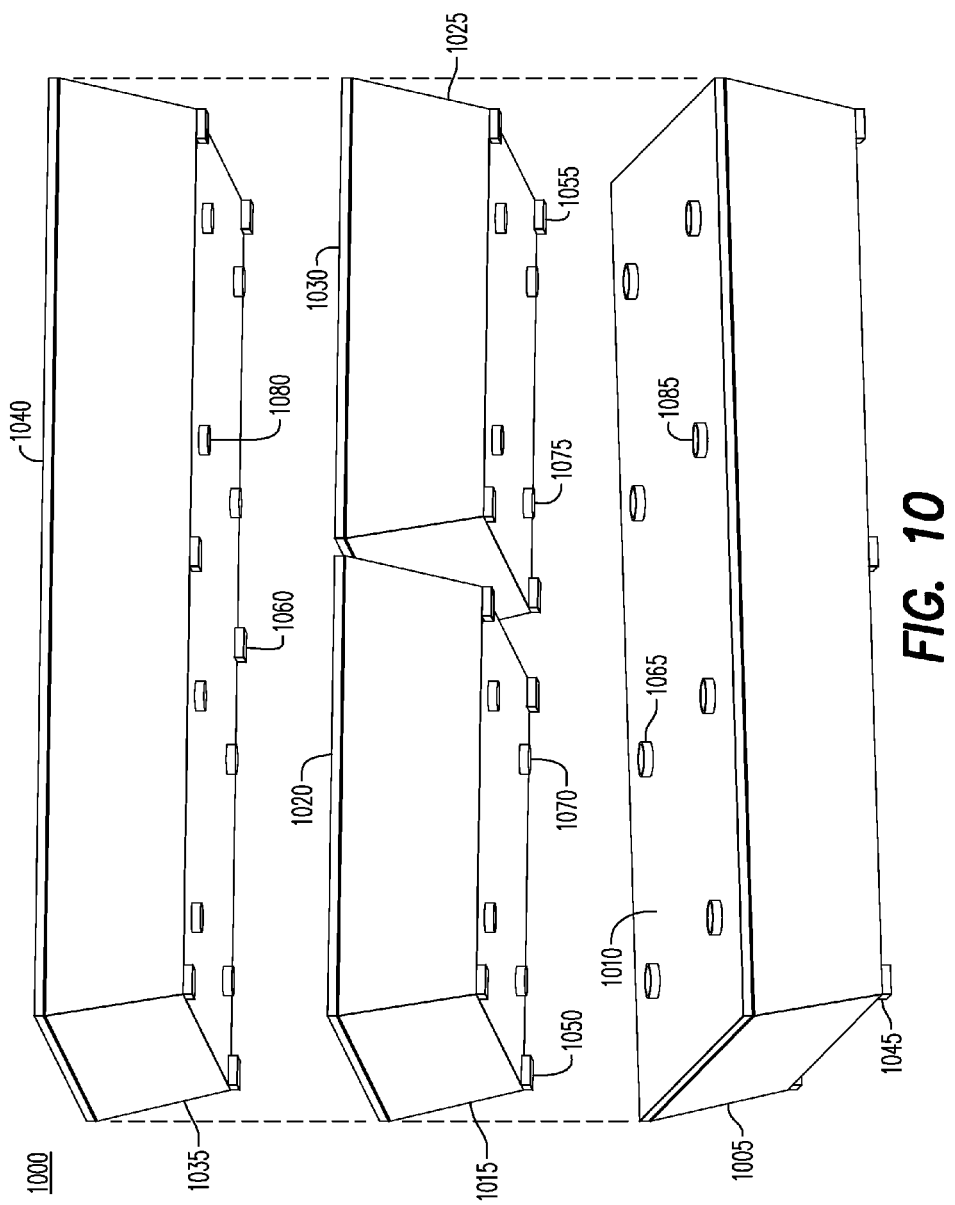
FIG. 10 is a perspective view of a container system depicting a plurality of different sized containers aligned with each other, according to some embodiments herein.

In some aspects, containers having a similar or same size may be stacked onto each other as depicted in FIGS. 6-9. In some embodiments, container systems of different sizes including one or more container system features disclosed herein may be aligned and stacked. FIG. 10 illustrates a containers 1000 that includes a container 1005 having a lid 1010, container 1015 having a lid 1020, container 1025 having a lid 1030, and container 1035 having a lid 1040. As shown, each container has a plurality of feet (e.g., 1045, 1050, 1055, 1060, 1070, 1075, 1080) and the lids may contain a plurality of receptacles (e.g., 1065, 1085) for receiving the feet located on the bottom of the containers. FIG. 10 illustrates how containers of different sizes may be organized and aligned for stacking in accordance herewith.

Figure 11:
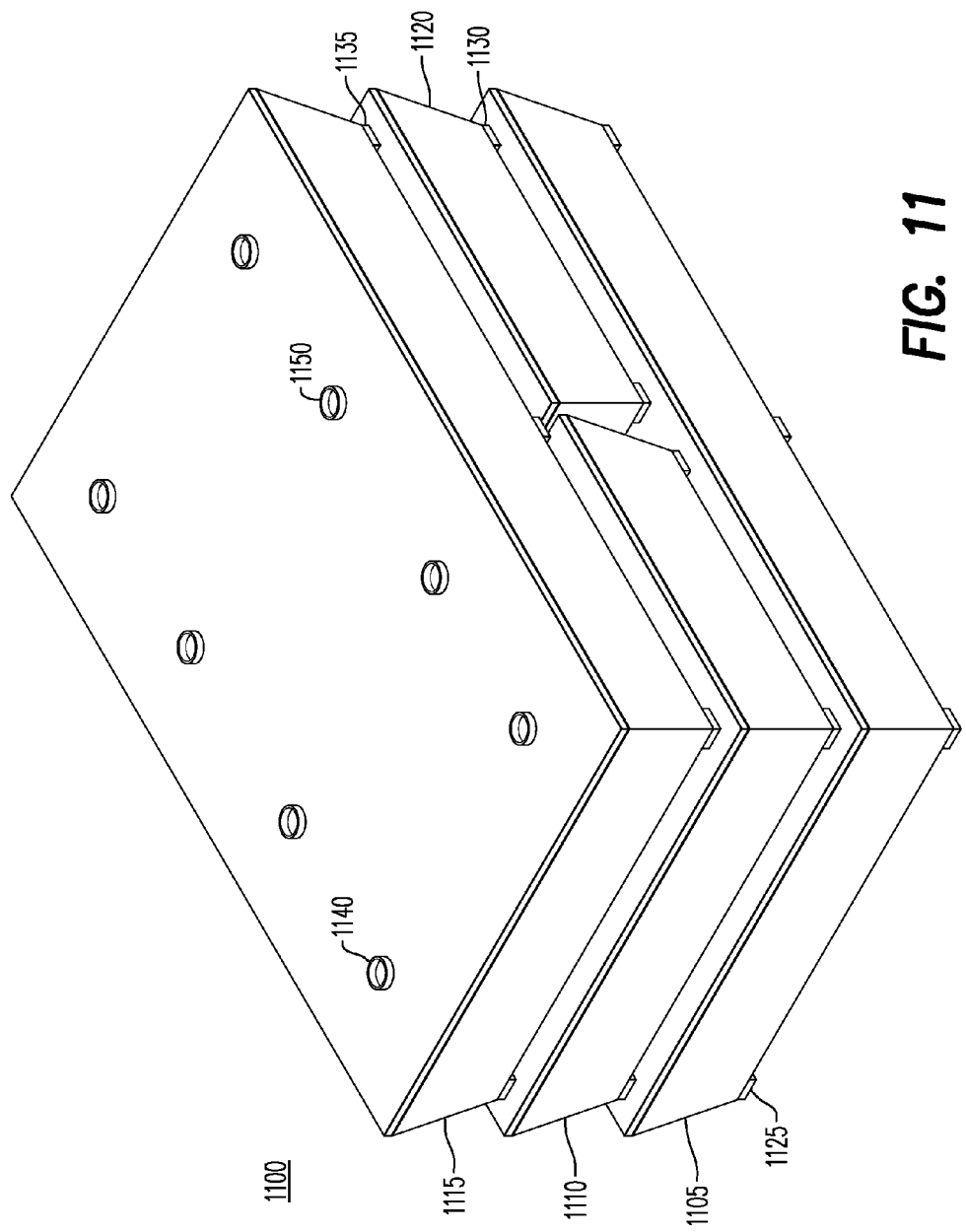
FIG. 11 is a perspective view of a container system depicting a plurality of different sized containers in a stacked configuration, according to some embodiments herein.

FIG. 11 is an illustrative depiction of four containers 1105, 1110, 1115, and 1120 in a stacked configuration. Each of the containers of FIG. 11 have a plurality of feet located on a bottom surface thereof (e.g., 1125, 1130, 1135), although all of such feet are not visible in FIG. 11. Also, each of the containers of FIG. 11 have a plurality of receptacles located on the lids that cover the containers, including but not limited to the receptacles shown (e.g., 1140, 1150) and those not visible in FIG. 11.

In addition to the exemplary embodiments described hereinabove, it will be understood that the foregoing description is of exemplary embodiments of the present disclosure and that the invention herein is not limited to the specific forms shown or described. For example, features of the various embodiments depicted herein, for example features shown in FIGS. 2, 4, 5, and 7, may be combined. In some such combinations some, but not necessarily all, of the features of a particular embodiment may be combined with one or more other embodiments.

These and other modifications may be made in the design and arrangement of other elements without departing from the scope of the invention as expressed in the appended claims.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A container system, the system comprising:
    a container housing having a bottom and a plurality of integrally connected walls, the bottom and walls having an interior face defining an interior holding area of the container housing and an outwardly facing exterior face;
    a container cover coupled to the exterior face of at least one of the plurality of walls, the container cover having a bottom wall, pair of opposing sidewalls, and a face panel connected to the bottom wall and sidewalls of the container cover; and an interior surface of the face panel opposite and spaced apart from the exterior face of the at least one of the plurality of walls, the interior surface of the face panel and the exterior face of the at least one of the plurality of walls defining a void therebetween; and
    a container lid that mates with the container housing, wherein the exterior face of at least one of the plurality of walls of the container housing to which the container cover is coupled to is the container lid.

2. The system of claim 1, wherein the void between the interior surface of the face panel and the exterior face of the at least one of the plurality of walls is adapted to receive a printed label.

3. The system of claim 1, wherein at least a portion of the face panel is at least one of semitransparent and transparent.

4. The system of claim 1, further comprising a cover coupling, the cover coupling integral to the exterior face of the at least one of the plurality of walls to which the container cover is coupled and engages with the container cover to couple the container cover to the at least one of the plurality of walls.

5. The system of claim 4, further comprising a container coupling, the container coupling integral to at least the sidewalls of the container cover and engages with the cover coupling of the container housing.

6. The system of claim 1, wherein the container cover is removably coupled to the at least one of the plurality of walls of the container housing.

7. The system of claim 1, wherein the at least one of the plurality of walls of the container housing is one of the plurality of walls of the container housing.

8. The system of claim 1, wherein the container cover further comprises a top wall integrally connected to the face panel and the side walls, spaced apart from and opposing the bottom wall.

9. The system of claim 1, further comprising a second container cover, the second container cover having a bottom wall, pair of opposing side walls, and a face panel integrally connected to the bottom wall and sidewalls; and an interior surface of the face panel opposite and spaced apart from the exterior face of a second at least a one of the plurality of walls, the interior surface of the face panel of the second container cover and the exterior face of the second at least one of the plurality of walls defining a void therebetween.

10. A container system, the system comprising:
    a container housing having a bottom and a plurality of integrally connected walls, the bottom and walls having an interior face defining an interior holding area of the container housing and an outwardly facing exterior face;
    a container cover coupled to the exterior face of at least one of the plurality of walls, the container cover having a bottom wall, pair of opposing sidewalls, and a face panel connected to the bottom wall and sidewalls of the container cover; and an interior surface of the face panel opposite and spaced apart from the exterior face of the at least one of the plurality of walls, the interior surface of the face panel and the exterior face of the at least one of the plurality of walls defining a void therebetween; and
    a cover coupling, the cover coupling integral to the exterior face of the at least one of the plurality of walls to which the container cover is coupled and engages with the container cover to couple the container cover to the at least one of the plurality of walls.

11. The system of claim 10, further comprising a container lid that mates with the container housing, wherein the exterior face of at least one of the plurality of walls of the container housing to which the container cover is coupled to is the container lid.

12. The system of claim 10, wherein the void between the interior surface of the face panel and the exterior face of the at least one of the plurality of walls is adapted to receive a printed label.

13. The system of claim 10, wherein at least a portion of the face panel is at least one of semitransparent and transparent.

14. The system of claim 10, further comprising a container coupling, the container coupling integral to at least the sidewalls of the container cover and engages with the cover coupling of the container housing.

15. The system of claim 10, wherein the container cover is removably coupled to the at least one of the plurality of walls of the container housing.

16. The system of claim 10, wherein the at least one of the plurality of walls of the container housing is one of the plurality of walls of the container housing.

17. The system of claim 10, wherein the container cover further comprises a top wall integrally connected to the face panel and the side walls, spaced apart from and opposing the bottom wall.

18. The system of claim 10, further comprising a second container cover, the second container cover having a bottom wall, pair of opposing side walls, and a face panel integrally connected to the bottom wall and sidewalls; and an interior surface of the face panel opposite and spaced apart from the exterior face of a second at least a one of the plurality of walls, the interior surface of the face panel of the second container cover and the exterior face of the second at least one of the plurality of walls defining a void therebetween.

19. A container system, the system comprising:
 a container housing having a bottom and a plurality of integrally connected walls, the bottom and walls having an interior face defining an interior holding area of the container housing and an outwardly facing exterior face; and
 a container cover coupled to the exterior face of at least one of the plurality of walls, the container cover having a bottom wall, pair of opposing sidewalls, and a face panel connected to the bottom wall and sidewalls of the container cover; and an interior surface of the face panel opposite and spaced apart from the exterior face of the at least one of the plurality of walls, the interior surface of the face panel and the exterior face of the at least one of the plurality of walls defining a void therebetween, wherein the container cover is removably coupled to the at least one of the plurality of walls of the container housing.

20. The system of claim 19, further comprising a container lid that mates with the container housing, wherein the exterior face of at least one of the plurality of walls of the container housing to which the container cover is coupled to is the container lid.

21. The system of claim 19, wherein the void between the interior surface of the face panel and the exterior face of the at least one of the plurality of walls is adapted to receive a printed label.

22. The system of claim 19, wherein at least a portion of the face panel is at least one of semitransparent and transparent.

23. The system of claim 19, further comprising a cover coupling, the cover coupling integral to the exterior face of the at least one of the plurality of walls to which the container cover is coupled and engages with the container cover to couple the container cover to the at least one of the plurality of walls.

24. The system of claim 23, further comprising a container coupling, the container coupling integral to at least the sidewalls of the container cover and engages with the cover coupling of the container housing.

25. The system of claim 19, wherein the at least one of the plurality of walls of the container housing is one of the plurality of walls of the container housing.

26. The system of claim 19, wherein the container cover further comprises a top wall integrally connected to the face panel and the side walls, spaced apart from and opposing the bottom wall.

27. The system of claim 19, further comprising a second container cover, the second container cover having a bottom wall, pair of opposing side walls, and a face panel integrally connected to the bottom wall and sidewalls; and an interior surface of the face panel opposite and spaced apart from the exterior face of a second at least a one of the plurality of walls, the interior surface of the face panel of the second container cover and the exterior face of the second at least one of the plurality of walls defining a void therebetween.

* * * * *